United States Patent
Hashimoto

(10) Patent No.: US 10,409,262 B2
(45) Date of Patent: Sep. 10, 2019

(54) NUMERICAL CONTROLLER FOR DATA REQUEST WITH VARIABLE DATA SIZE

(71) Applicant: FANUC CORPORATION, Minamitsuru-gun, Yamanashi (JP)

(72) Inventor: Arito Hashimoto, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 113 days.

(21) Appl. No.: 15/690,628

(22) Filed: Aug. 30, 2017

(65) Prior Publication Data

US 2018/0067472 A1   Mar. 8, 2018

(30) Foreign Application Priority Data

Sep. 2, 2016   (JP) .................................. 2016-171931

(51) Int. Cl.
*G06F 19/00* (2018.01)
*G05B 19/408* (2006.01)

(52) U.S. Cl.
CPC .. *G05B 19/408* (2013.01); *G05B 2219/37533* (2013.01)

(58) Field of Classification Search
CPC .................... G05B 19/408; G05B 2219/37533
See application file for complete search history.

(56) References Cited

U.S. PATENT DOCUMENTS

| | | | | |
|---|---|---|---|---|
| 6,907,042 | B1 * | 6/2005 | Oguchi | H04L 47/30 370/230 |
| 2005/0111456 | A1 * | 5/2005 | Inazumi | H04L 69/16 370/394 |
| 2013/0080657 | A1 * | 3/2013 | Yamaguchi | H04L 1/187 709/234 |
| 2013/0235729 | A1 * | 9/2013 | Mutoh | H04L 47/27 370/237 |
| 2014/0316536 | A1 * | 10/2014 | Nakajima | G05B 19/18 700/11 |

FOREIGN PATENT DOCUMENTS

| | | |
|---|---|---|
| JP | 61202205 A | 9/1986 |
| JP | 10327212 A | 12/1998 |
| JP | 2000207006 A | 7/2000 |
| JP | 2003-195930 A | 7/2003 |
| WO | 2011158467 A1 | 12/2011 |

OTHER PUBLICATIONS

Japanese Notification of Reasons for Refusal for Japanese Application 2016-171931, with English Translation, dated Nov. 13, 2018—6 pages.

* cited by examiner

*Primary Examiner* — Michael D Masinick
(74) *Attorney, Agent, or Firm* — RatnerPrestia

(57) ABSTRACT

A numerical controller which can prevent the stoppage of operation caused by the shutting off of communication with a host computer includes a communication unit for sending an NC data acquisition request containing a data size specification to a host computer, and a numerical control unit for performing operation using NC data sent from the host computer in response to the NC data acquisition request. Every fixed period, the communication unit sends, to the host computer, the NC data acquisition request containing the data size specification corresponding to a quantity of the NC data consumed by the numerical control unit.

3 Claims, 3 Drawing Sheets

NUMERICAL CONTROLLER FOR DATA REQUEST WITH VARIABLE DATA SIZE

BACKGROUND OF THE INVENTION

1. Field of the Invention

The present invention relates to a numerical controller, and particularly relates to a technique for controlling communication with a host computer.

2. Description of the Related Art

Some numerical controllers operate using NC data stored in a built-in storage medium (typically, nonvolatile memory, hard disk drive, or the like). Some other numerical controllers have a function that successively acquires NC data from a host computer through a network line and operates using the acquired NC data. The latter operation style is called DNC operation.

Generally, in DNC operation using a network line, the transport layer in the OSI reference model uses Transmission Control Protocol (TCP). In TCP, the sender and the receiver agree to a receive window size.

A receive window size is the quantity of data which the sender is allowed to continuously send without receiving an acknowledgment (ACK) from the receiver. The receiver determines a receive window size and sets information indicating the receive window size in an ACK which is sent to the sender. The sender determines the quantity of data capable of being continuously sent in accordance with the receive window size contained in the ACK.

During DNC operation, when a numerical controller starts communication with a host computer, the numerical controller notifies the host computer of a receive window size. The host computer sends NC data to the numerical controller in accordance with the receive window size received from the numerical controller.

The numerical controller accumulates the received NC data in a buffer. The numerical controller consumes the accumulated NC data by operation. When the size of NC data consumed becomes equal to the receive window size, the numerical controller sets information indicating a receive window size in an ACK which is sent to the host computer, thereby making a request for sending subsequent NC data. Upon receiving the ACK from the numerical controller, the host computer sends NC data to the numerical controller in accordance with the receive window size contained in the ACK. This is repeated, and NC data are intermittently sent from the host computer to the numerical controller. Thus, DNC operation is realized.

Japanese Patent Application Laid-Open No. 2003-195930 discloses one example of a system for performing DNC operation. In this example, a host computer generates NC data and schedule data and sends the NC data and the schedule data to a control computer which is integrally provided in a machine tool, and the control computer sends the NC data to a numerical controller in accordance with the schedule data.

In the case of a low feed rate, a low override, or the like, it may take a long time for the numerical controller to perform operation, and NC data may be consumed at slow speed. In such a case, until the size of NC data consumed becomes equal to a receive window size, the numerical controller cannot notify the host computer of a receive window size. As a result, a period of time (no-communication period) during which NC data is not sent from the host computer may become long.

The host computer may monitor the quantity of communication data per unit time and shut off the communication when the quantity of communication data per unit time becomes smaller than a specified value during a predetermined period. If the communication is shut off, the NC data accumulated in the buffer of the numerical controller are exhausted, and the operation is suspended. The suspension of operation causes problems such as a cutter mark or vibrations on a workpiece which is being machined.

SUMMARY OF THE INVENTION

The present invention has been accomplished to solve the above-described problems, and an object of the present invention is to provide a numerical controller which can prevent the stoppage of operation caused by the shutting off of communication with a host computer.

A numerical controller according to one embodiment of the present invention includes a communication unit for sending an NC data acquisition request containing a data size specification to a host computer, and a numerical control unit for performing operation using NC data sent from the host computer in response to the NC data acquisition request. Every fixed period, the communication unit sends the NC data acquisition request containing the data size specification corresponding to a quantity of the NC data consumed by the numerical control unit.

In a numerical controller according to another embodiment, the communication unit sends as the NC data acquisition request an ACK packet specifying the data size in the form of a receive window size to the host computer.

In a numerical controller according to another embodiment, the fixed period is less than a time limit after which communication between the numerical controller and the host computer is shut off.

The present invention provides a numerical controller which can prevent the stoppage of operation caused by the shutting off of communication with a host computer.

BRIEF DESCRIPTION OF THE DRAWINGS

These and other objects and features of the present invention will become apparent from the following description of an exemplary embodiment with reference to the accompanying drawings in which.

DETAILED DESCRIPTION OF THE PREFERRED EMBODIMENT

Hereinafter, an embodiment of the present invention will be described with reference to the drawings.

Figure 1:
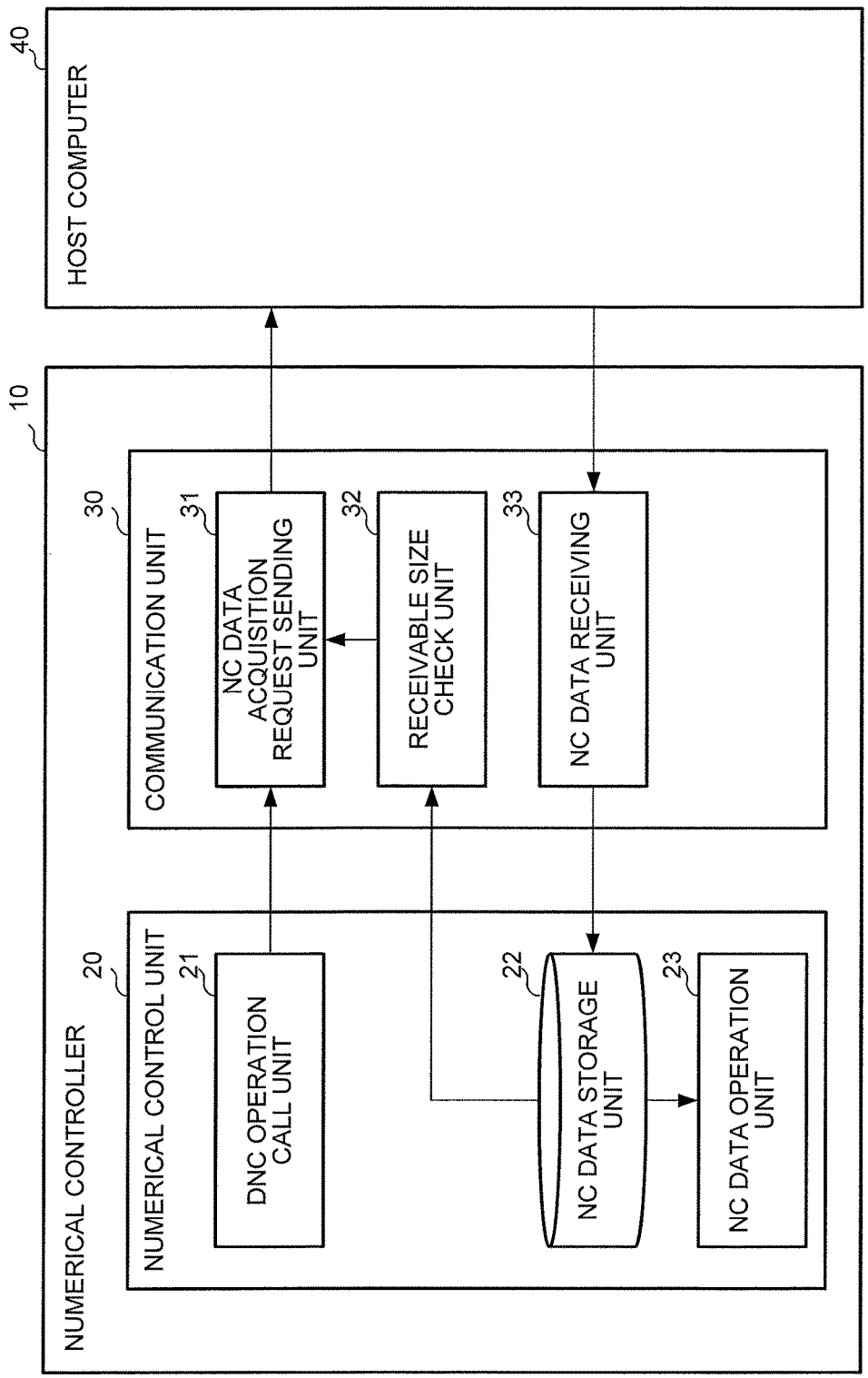
FIG. 1 is a diagram showing the configuration of a numerical controller 10 according to an embodiment of the present invention.

Referring to a block diagram in FIG. 1, the configuration of a numerical controller 10 according to an embodiment of the present invention will be described. The numerical controller 10 includes a numerical control unit 20 and a communication unit 30. The numerical controller 10 is connected to the host computer 40 so that communication can be performed therebetween.

The numerical control unit 20 includes a DNC operation call unit 21, an NC data storage unit 22, and an NC data operation unit 23. The DNC operation call unit 21 performs a process for starting DNC operation. The NC data storage unit 22 includes a memory area (buffer) for storing NC data received from the host computer 40. The NC data operation unit 23 performs operation processing in accordance with the NC data stored in the NC data storage unit 22.

The communication unit 30 includes an NC data acquisition request sending unit 31, a receivable size check unit 32, and an NC data receiving unit 33. The NC data receiving unit 33 performs a process for receiving NC data from the host computer 40. The receivable size check unit 32 performs a process for checking, that is, identifying, the size of data capable of being received from the host computer 40. The NC data acquisition request sending unit 31 performs a process for notifying the host computer 40 of a receive window size in response to the request from the DNC operation call unit 21 and the receivable size check unit 32.

Typically, the numerical controller 10 logically realizes the above-described various processing units by a central processing unit (CPU) executing a predetermined process in accordance with a program stored in a memory device and, when necessary, performing tasks such as controlling various hardware components.

Figure 2:
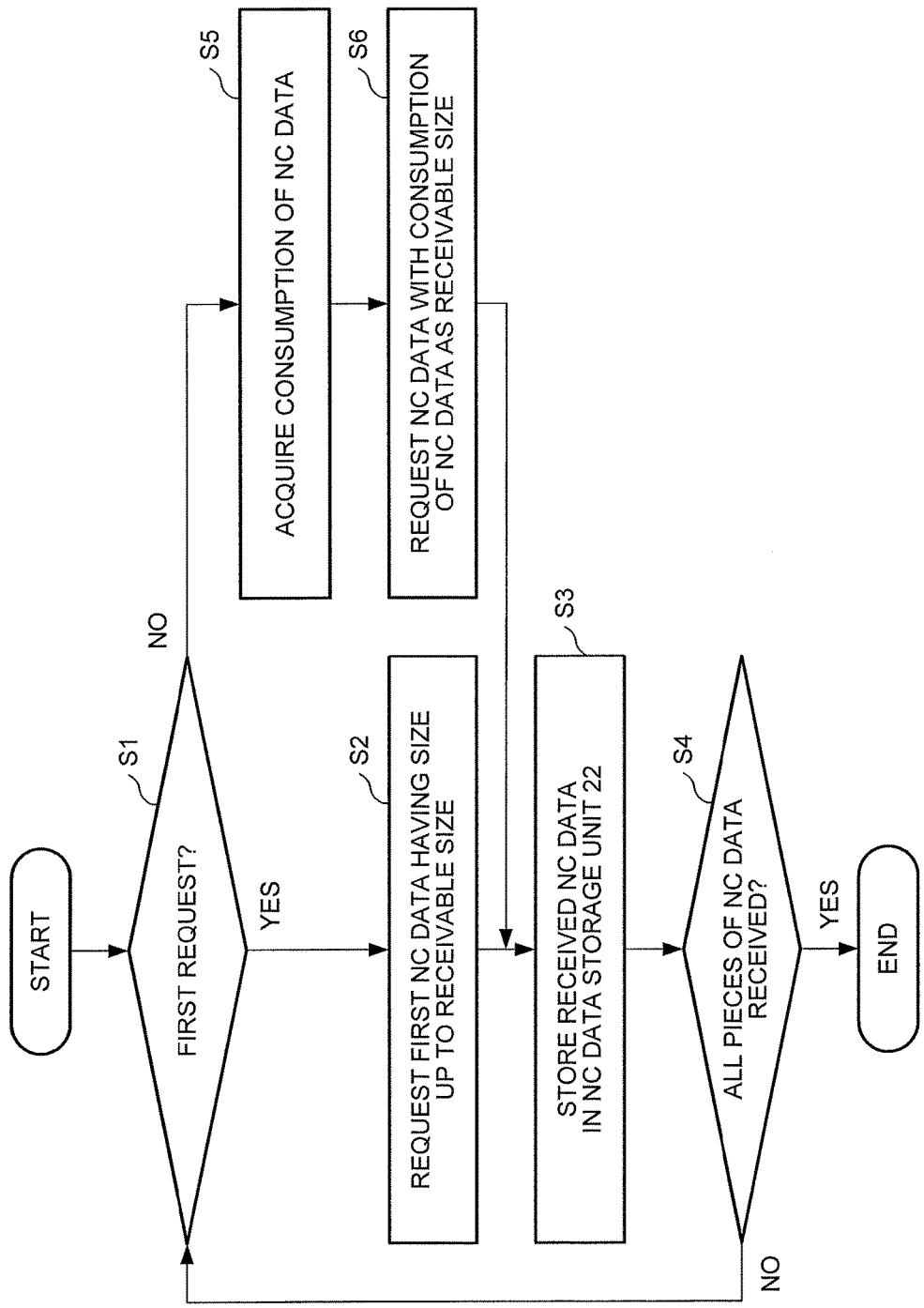
FIG. 2 is a diagram showing the operation of the numerical controller 10 according to the embodiment of the present invention.

Next, the operation of the numerical controller 10 will be described with reference to a flowchart in FIG. 2 and a schematic diagram in FIG. 3.

S1:

The NC data acquisition request sending unit 31 determines whether this is the first time that the NC data acquisition request sending unit 31 makes an NC data acquisition request to the host computer 40. If this is the first time, the flow goes to step S2; otherwise, the flow goes to step S5.

S2:

The DNC operation call unit 21 requests the NC data acquisition request sending unit 31 of the communication unit 30 to execute an NC data acquisition process.

The NC data acquisition request sending unit 31 accesses the host computer 40 and makes an NC data acquisition request. The NC data acquisition request sending unit 31 typically sends a packet containing the receive window size to the host computer 40 to make an NC data acquisition request. The NC data acquisition request sending unit 31 can specify as the receive window size any size not more than the size of the buffer of the numerical controller 10, but preferably specifies the maximum size of data which the numerical controller 10 can receive and store.

S3:

The host computer 40 sends NC data to the NC data receiving unit 33 in accordance with the receive window size of which the host computer 40 has been notified. The NC data receiving unit 33 receives the NC data sent from the host computer 40 and stores the NC data in the NC data storage unit 22.

Figure 3:
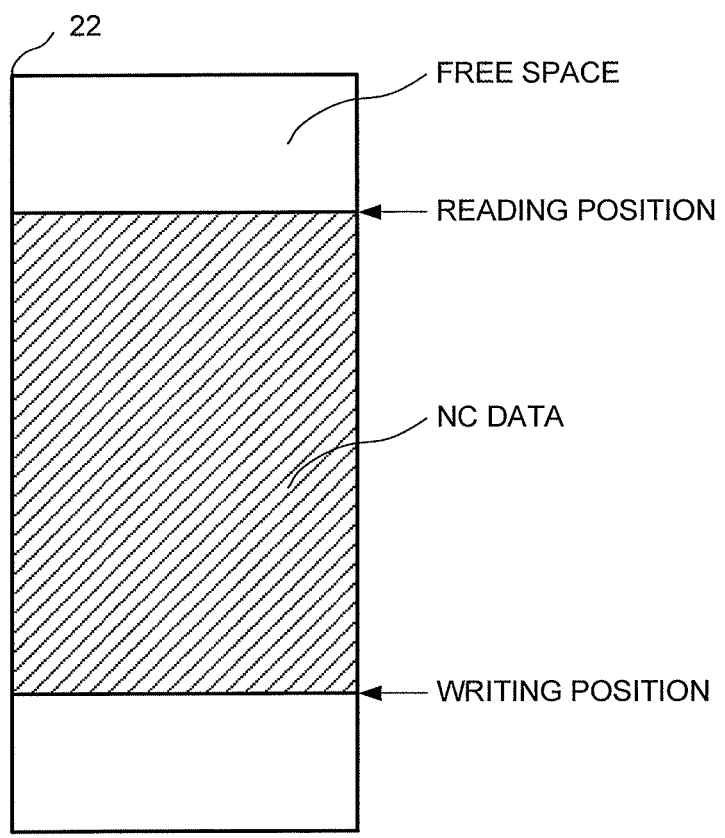
FIG. 3 is a schematic diagram showing a form of an NC data storage unit 22.

It is assumed that the numerical controller 10 retains a writing position on the NC data storage unit 22 (FIG. 3). The writing position means the address indicating the end position of the NC data stored in the NC data storage unit 22. Upon storing NC data in the NC data storage unit 22, the NC data receiving unit 33 updates the writing position.

S4:

The NC data receiving unit 33 determines whether all pieces of NC data have been received from the host computer 40. If all pieces of NC data have been received, the process is ended; otherwise, the flow goes to step S1.

S5:

The NC data operation unit 23 sequentially reads the NC data stored in the NC data storage unit 22 and performs operation.

It is assumed that the numerical controller 10 retains a reading position on the NC data storage unit 22 (FIG. 3). The reading position means the address indicating the end position of the NC data read and consumed from the NC data storage unit 22. Upon reading NC data, the NC data operation unit 23 updates the reading position.

S6:

The receivable size check unit 32 acquires the reading position on the NC data storage unit 22 periodically, that is, every fixed period (for example, at time intervals of one second). Further, the receivable size check unit 32 compares the size (corresponding to the difference between the writing position and the reading position immediately after the last storing) of NC data which have been received and stored by the NC data receiving unit 33 pervious time and the current difference between the writing position and the reading position. Thus, the quantity of NC data used, that is, consumed, by the NC data operation unit 23 can be identified. The receivable size check unit 32 requests the NC data acquisition request sending unit 31 to execute an NC data acquisition process in which the identified consumption of NC data is specified as a receivable size.

The above-described fixed period may be specified as desired in a range less than a time limit after which communication between the numerical controller 10 and the host computer 40 is shut off.

The NC data acquisition request sending unit 31 specifies the receivable size requested by the receivable size check unit 32 as a receive window size and sends an ACK packet to the host computer 40. In response to this, the host computer 40 sends, to the NC data receiving unit 33, NC data having a size corresponding to the quantity of NC data consumed by the NC data operation unit 23.

Thus, the numerical controller 10 according to the present embodiment checks the consumption of NC data every fixed period, and successively acquires NC data having a size corresponding to the consumption from the host computer 40. Accordingly, a period of time during which NC data are not sent from the host computer 40 does not exceed the fixed period even if it takes a long time for the numerical controller 10 to perform operation processing. This can prevent the stoppage of operation of the numerical controller 10 caused by the shutting off of communication between the numerical controller 10 and the host computer 40. To do this, no change needs to be made to the host computer 40 side.

It should be noted that the present invention is not limited to the above-described embodiment, and can be appropriately modified without departing from the spirit thereof. In the present invention, any component of the embodiment can be modified or omitted within the scope of the invention.

For example, in the above-described embodiment, only an example has been described in which the consumption of NC data is checked every fixed period and in which NC data having a size corresponding to the consumption is successively acquired from the host computer 40. However, the present invention is not limited to this, and the present invention can be used in combination with a prior-art configuration. Specifically, in normal cases, as in the prior art, when the size of NC data consumed becomes equal to a receive window size, the numerical controller 10 sends, to the host computer 40, an NC data acquisition request in which the receive window size is re-specified. Specifically, the numerical controller 10 makes a new NC data acquisition request every time the received NC data is totally consumed. However, if the interval of sending an NC data acquisition request exceeds a fixed period, the receivable size check unit 32 checks the consumption of NC data at that time, and the NC data acquisition request sending unit 31 makes a request to the host computer 40 for sending NC data in which a receive window size corresponding to the above-described consumption is specified. In this configuration, the above-described fixed period is preferably set to as long a period of time as possible in a range less than the time limit after which communication between the numerical controller 10 and the host computer 40 is shut off. Such a configuration produces the effect of reducing the amount of communication between the numerical controller 10 and the host computer 40 and reducing the load caused by communication processing compared to the aforementioned embodiment.

Moreover, in the aforementioned embodiment, a receive window size is used as means by which the numerical controller 10 specifies the quantity of NC data to be acquired with respect to the host computer 40, but the present invention is not necessarily limited to this. As long as the size of NC data to be acquired can be specified, any other notification means may be used.

While an embodiment of the present invention has been described, the present invention is not limited to the above-described exemplary embodiment, but can be carried out in other aspects by making appropriate modifications thereto.

The invention claimed is:

1. A numerical controller comprising:
   a communication unit for sending an NC data acquisition request containing a data size specification to a host computer; and
   a numerical control unit for performing operation using NC data sent from the host computer in response to the NC data acquisition request,
   wherein every fixed period, the communication unit sends the NC data acquisition request containing the data size specification, the data size specification varies in response to a quantity of the NC data consumed by the numerical control unit within each fixed period.

2. The numerical controller according to claim 1, wherein the communication unit sends as the NC data acquisition request an ACK packet specifying the data size in the form of a receive window size to the host computer.

3. The numerical controller according to claim 1, wherein the fixed period is less than a time limit after which communication between the numerical controller and the host computer is shut off.

* * * * *